United States Patent [19]

Kilmurray et al.

[11] Patent Number: 5,919,299

[45] Date of Patent: Jul. 6, 1999

[54] PROCESS FOR PRODUCING TRANSPARENT PIGMENTARY QUINACRIDONES BY ACID SWELLING OF PREMILLED SUBPIGMENTARY QUINACRIDONES IN THE PRESENCE OF AN ORGANIC LIQUID

[75] Inventors: Lindsay Kilmurray, deceased, late of Wilmington, Del., by Greta S. Kilmurry, executor; Edward E. Jaffe, Wilmington, Del.

[73] Assignee: Ciba Specialty Chemicals Corporation, Tarrytown, N.Y.

[21] Appl. No.: 08/984,196

[22] Filed: Dec. 3, 1997

Related U.S. Application Data

[60] Provisional application No. 60/032,338, Dec. 4, 1996.

[51] Int. Cl.$^6$ .................................................. C09B 48/00
[52] U.S. Cl. .............................. 106/497; 106/495; 546/49
[58] Field of Search ................................ 106/495, 497; 546/49

[56] References Cited

U.S. PATENT DOCUMENTS

| | | | |
|---|---|---|---|
| 3,124,581 | 3/1964 | Bohler et al. | 106/497 |
| 3,157,659 | 11/1964 | Deuschel et al. | 106/497 |
| 3,160,510 | 12/1964 | Ehrich | 106/495 |
| 3,790,575 | 2/1974 | Hafele et al. | 106/497 |
| 3,793,327 | 2/1974 | Jaffe | 106/497 |
| 4,247,695 | 1/1981 | Fitzgerald | 106/497 |
| 4,247,696 | 1/1981 | Shibata et al. | 106/497 |
| 4,455,173 | 6/1984 | Jaffe | 106/497 |
| 4,857,646 | 8/1989 | Jaffe | 106/497 |
| 4,881,980 | 11/1989 | Dietz et al. | 106/497 |
| 5,318,626 | 6/1994 | Maki et al. | 106/497 |

FOREIGN PATENT DOCUMENTS

| | | | |
|---|---|---|---|
| 245475 | 6/1963 | Australia | 106/497 |
| 544160 | 6/1993 | European Pat. Off. | 106/497 |
| 5-125292 | 5/1993 | Japan | 106/497 |

*Primary Examiner*—Anthony Green
*Attorney, Agent, or Firm*—Kevin T. Mansfield; David R. Crichton

[57] ABSTRACT

A process for preparing transparent, pigmentary quinacridone compounds and solid solutions thereof comprises combining a premilled, sub-pigmentary powder containing at least one unsubstituted or substituted quinacridone or a derivative thereof with a sufficient amount of moderately concentrated sulfuric acid to form a slurry, then agitating this slurry in the presence of an organic liquid which is immiscible or only partially miscible with the slurry and which is effective in deagreggating and improving the crystallinity of the pigment, for an effective length of time to convert the sub-pigmentary unsubstituted or substituted quinacridone or solid solution thereof to a transparent, pigmentary form.

20 Claims, No Drawings

PROCESS FOR PRODUCING TRANSPARENT PIGMENTARY QUINACRIDONES BY ACID SWELLING OF PREMILLED SUBPIGMENTARY QUINACRIDONES IN THE PRESENCE OF AN ORGANIC LIQUID

This application claims the benefit under 35 U.S.C. 119(e) of U.S. Provisional Application Ser. No. 60/032,338, filed Dec. 4, 1996.

The present invention relates to a process for producing transparent pigmentary quinacridones by acid swelling of premilled sub-pigmentary quinacridones in the presence of an organic liquid.

BACKGROUND

If the particle size of a pigment is made sufficiently fine, it will appear transparent The popularity of metallic and mica finishes in the automotive industry ensures that the demand for highly transparent pigments (i.e. those of small particle size) will continue for the foreseeable future.

Transparent pigments are usually produced by reducing the particle size of a crude pigment during the finishing operations. The processes employed to obtain small particle size pigments include dispersion milling and High-Turbulence (HT) drowning among others. Preparing transparent pigments by dispersion milling is well known in the art and is described for example in U.S. Pat. Nos. 2,402,167, 3,030,370 and 4,088,506. Preparing transparent pigments by HT drowning is also well known and is described for example in U.S. Pat. Nos. 3,326,918, 3,607,336 and 3,681,100. These processes are expensive and ecologically undesirable. Consequently alternative routes to transparent pigments, and in particular transparent quinacridone pigments, are desirable.

In HT drowning, a pigment direct from synthesis, i.e. without particle size reduction, is dissolved completely in concentrated sulfuric acid and precipitated in pigmentary particle size by drowning the resulting solution into water under high shear conditions. The desired crystal size is obtained by controlling the temperature and the mixing turbulence during the drowning and through the use of growth inhibitors. Since drowning quinacridone pigments from acid tends to yield the α and β crystal phases, this finishing method is unsuitable for preparing γ-phase quinacridone products.

The production of β-phase quinacridone pigments by HT drowning requires the presence of a β-phase director, often an aromatic sulfonic acid. HT drowning therefore has a negative impact on the environment since it requires neutralization of the spent sulfuric and aromatic sulfonic acids. The aromatic sulfonic acids are most often prepared by sulfonation of an aromatic hydrocarbon with sulfuric acid, the former being a potential source of air pollution. Furthermore, aromatic sulfonic acids are known to desulfonate in a dilute aqueous acid medium at elevated temperatures giving the corresponding aromatic hydrocarbon. These conditions often arise in waste treatment, again providing a potential source of pollution. Additionally, the cost of the large amount of acid, together with that of the base to neutralize it, exerts a heavy financial burden on this type of processing.

In dispersion milling, the particle size of a crude pigment is reduced by grinding it, for example in a roller mill with steel grinding media. This grinding is generally carried out in the presence of four to five times the pigment weight of hydrated aluminum sulfate (alum) or other salt. The pigment in the alum mill powder grows with relative uniformity when the alum is extracted with dilute sulfuric acid. Because the pigment is never fully dissolved, the crystal phase of the crude pigment is preserved and transparent β and γ-phase products can be made. However, the cost of this process is also high since the alum must be neutralized and then becomes part of the suspended solids to be disposed of in the waste stream. Consequently a new process that reduces or eliminates the use of sulfuric acid, aromatic sulfonic acids or alum is desirable.

One way to reduce particle size more economically is by grinding a crude pigment with a reduced amount of salt This process has been termed "premilling". However, premilled powder is unsatisfactory as a pigment since the particle size is reduced to a sub-pigmentary, nearly amorphous state. To make a useful product it must be further processed. A successful process based on premilling requires a controlled deaggregation-recrystallization step. In copper phthalocyanine pigment finishing, one way this has been achieved is by acid swelling. See for example U.S. Pat. No. 3,051,720.

Acid swelling or permutoid swelling is a process that has been known for years in copper phthalocyanine pigment manufacture. According to this process a premilled pigment powder is contacted with sulfuric acid at an acid concentration such that an equilibrium exists between the protonated and unprotonated pigment species. Small pigment particles are generated when this equilibrium is shifted in the direction of the unprotonated species. Attempts to use this type of process for quinacridone pigments lead to products having the undesirable α crystalline phase. However it has been demonstrated in U.S. Pat. No. 4,247,695 that the pigment phase of quinacridones can be controlled by judicious control of the acid concentration. Nevertheless, pigments produced according to this procedure are not completely deaggregated. They therefore show undesirable dullness and tinctorial weakness versus pigments prepared by the conventional routes.

It is known that acid swelling in moderately concentrated acid can be used to produce transparent quinacridone pigments. Specifically, small particle size β-quinacridone can be produced from premilled non-pigmentary β-quinacridone by acid swelling. Control of the acid concentration is critical to prevent conversion to β-quinacridone and to control the particle size. When acid swelling is used to make solid solutions comprising quinacridone, quinacridonequinone, dihydroquinacridone or their substituted derivatives, the acid strength must be low enough that it does not dissolve any of the individual components and thus destroy the solid solution.

The advantage of an acid swelling process over HT drowning lies mainly in the lower amount of acid required. In acid swelling the pigment to acid ratio can be as low as about 1:1 compared to typical HT-drowning at a pigment to acid ratio of about 1:7.4. In the latter case the higher amount and the use of concentrated sulfuric acid are essential since the acid must completely dissolve the pigment to produce the narrow particle size range that affords the most desirable pigment properties. In the former case use of lower acid strength avoids phase changes that would occur if the acid strength were sufficient to dissolve the pigment to any appreciable degree. Additionally, substantially less acid is required.

Pigments produced by acid swelling are often weak in tinting strength and exhibit an undesirable dullness in color. This is a result of failure to deaggregate the premilled powder completely. Standard procedures for increasing the level of deaggregation include extending the swelling time and/or increasing the temperature. However these procedures can be impractical or may lead to undesirable side reactions.

It is known that treatment of a premilled quinacridone or phthalocyanine pigment with a separate organic liquid in the presence of an aqueous base and a surfactant improves the crystallinity of the pigment particles and results in increased pigment tinting strength. See, for example U.S. Pat. No. 4,541,872. However these pigments are generally opaque. It is also known that conditioning of a quinacridone or dioxazine violet pigment with acid may be usefully followed by a separate treatment with a solvent to give pigments that are commercially acceptable. See U.S. Pat. No. 4,804,417 and JP 92/01462.

It has now been discovered that acid swelled transparent quinacridone pigments can be produced which have a much higher level of deaggregation if a separate organic phase is present during the acid swelling step. This results in a pigment with higher tinting strength and a more desirable intense hue. Other pigment properties are similar to those of commercially available transparent HT-drowned quinacridone pigments. Thus, a process has been found for preparing transparent, pigmentary quinacridone compounds and solid solutions thereof, which process comprises combining a premilled, sub-pigmentary powder containing at least one unsubstituted or substituted quinacridone or a derivative thereof with a sufficient amount of moderately concentrated sulfuric acid to form a slurry, then agitating this slurry in the presence of an organic liquid which is immiscible or only partially miscible with the slurry and which is effective in deaggregating and improving the crystallinity of the pigment, for an effective length of time to convert the sub-pigmentary unsubstituted or substituted quinacridone or solid solution thereof to a transparent, pigmentary form. The slurry may advantageously incorporate surfactants and pigment growth inhibitors. The subsequent workup steps typically include ripening the pigment, which consists of diluting the pigment slurry to about 20% acid strength with water and stirring for a period of time at a predetermined temperature, recovering the organic phase by distillation and separating the quinacridone pigment by filtration, followed by washing the pigment free of acid with water. The isolated presscake may be dried directly to a toner or surface treated by known procedures to improve dispersibility, rheological characteristics etc.

DETAILED DESCRIPTION OF THE INVENTION

This process is applicable to the preparation of transparent, pigmentary quinacridone compounds wherein the quinacridone compound is an unsubstituted or substituted quinacridone or a solid solution containing an unsubstituted or substituted quinacridone. Such compounds and solid solutions which comprise a quinacridone and/or substituted quinacridone and a quinacridonequinone or dihydroquinacridone are known per se. The quinacridone compounds which are used in the process of U.S. Pat. No. 4,247,695 are also suitable for use in the process of the present invention.

The quinacridone compounds to which the present invention is applicable are quinacridones of the formula I, dihydroquinacridones of the formula II and quinacridonequinones of the formula III

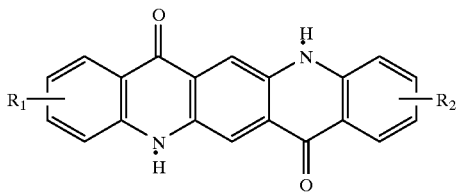

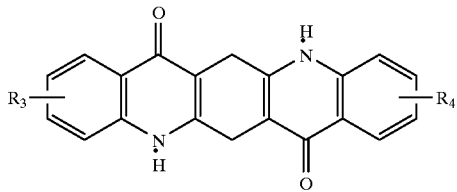

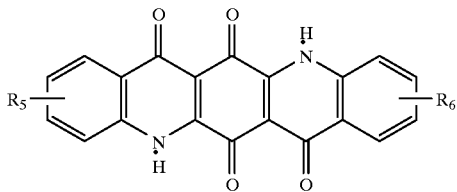

and mixtures thereof, where $R_1, R_2, R_3, R_4, R_5$ and $R_6$ are independently, hydrogen, fluorine, chlorine, bromine, alkyl or alkoxy.

Organic liquids which are either insoluble in water or can be made to form a separate phase by salting out and which cause quinacridone particles to grow from the low crystallinity state of a premilled pigment powder to a pigmentary grade material can be used in the process of the present invention. Some suitable organic liquids are disclosed in U.S. Pat. No. 4,541,872.

Preferred organic liquids for use in the present invention include alcohols with 4–12 carbon atoms, such as n-butanol, n-pentanol, n-hexanol, cyclohexanol and octyl alcohol, and ketones with 5–8 carbon atoms such as cyclohexanone, 2-pentanone and methyl isobutyl ketone (MIBK). The use of n-pentanol and similar alcohols is especially preferred. Although branched alcohols may be employed, they are not as practical since they are prone to dehydration under strongly acidic conditions and cannot be fully recovered. This makes them economically less desirable.

The amount of organic liquid is not critical so long as a separate phase is formed. It may range from 1 to 30% by weight, based on the weight of the pigment in the premilled powder. Although amounts greater than 30% are not harmful, they are unnecessary and merely add to the solvent recovery costs. Preferred amounts are 3 to 20%, with the most preferred amounts being from 3 to 15% by weight, based on the weight of the pigment.

The term "premilled quinacridone" is intended to include crude unsubstituted and substituted quinacridones and derivatives thereof which are finely milled in the presence of an inert grinding medium such as balls or rods, with or without the addition of an inorganic salt such as sodium sulfate or hydrated alum. This treatment may advantageously take place in the presence of surfactants or growth inhibitors known in the art. The presence of large amounts of salt for the grinding is not necessary.

The particle size of a premilled quinacridone pigment is affected by the amount of inorganic salt used. Amounts of salt that are useful range from 10 to 90% based on the weight of pigment, the remainder being the pigment and/or growth inhibitor. The amount of salt to use depends upon the salt itself. For example, less alum than sodium sulfate is required to produce a pigment of the same particle size. The amount of salt to use also depends on the pigment particle size desired. Larger amounts of salt generally give pigments of smaller particle size. The time required for premilling also depends on the particle size (sub-pigmentary) that is desired. It is usually 16 to 24 hours, but it may be 30 hours or more.

The most desirable and useful premilled quinacridone powder will be determined by a judicious balance of milling time, ratio of salt to pigment and the presence and amount of growth inhibitors. This can be determined for any particular quinacridone pigment or pigment mixture by routine experimentation.

The premilled quinacridone powder is mixed with a sufficient amount of moderately concentrated sulfuric acid to form a slurry. The strength of this sulfuric acid will vary depending on the pigment being conditioned, but is generally in the range of 35 to 65% by weight.

The moderately concentrated sulfuric acid used is obtained by dilution of standard commercial grade sulfuric acid that is nominally of 96% strength with water. The weight ratio of the acid to the pigment, on an "as is", i.e. nominal 96% basis, is advantageously in the range of 4–1 to 1, preferably in the range of 2.0–1.0 to 1 and most preferably 1.9–1.3 to 1. A low acid/pigment ratio is important from both an economic and ecological standpoint. A ratio of 1.5 parts of concentrated sulfuric acid to 1 part of pigment is typically used in the present process. This compares with a typical ratio of 7.4 parts of concentrated sulfuric acid that is required to completely dissolve 1 part of a quinacridone pigment for HT drowning.

For acid swelling to obtain the β form of unsubstituted or substituted quinacridone, an acid strength of 50 to 60% by weight of sulfuric acid is desirable, with 51–57% by weight being preferred and 52 to 54% by weight being most preferred. At lower acid strengths less particle growth is observed; while phase conversion and an increased amount of the undesired α-quinacridone is observed at higher acid concentrations.

To prepare solid solutions which contain quinacridone pigments, the acid strength must be low enough that it does not appreciably dissolve any of the individual components and destroy the actual or potential solid solution. For solid solutions containing about 25% of quinacridone and 75% of 2,9-dichloroquinacridone by weight, the most preferred acid concentration is in the range of 57 to 60% by weight, i.e. less than that required to dissolve substantial quantities of the quinacridone. For solid solutions containing quinacridonequinone, such as a solid solution containing γ-quinacridone, quinacridonequinone and dihydroquinacridone, the most preferred acid concentration is in the range 38 to 42% by weight.

The temperature during the acid swelling step is advantageously in the range of 40 to 90 C, with 50 to 80 C being preferred and 65 to 75 C being most preferred. One will appreciate that at lower temperatures higher acid concentrations can be employed. Thus, to obtain the β-form of quinacridone, at 40° C., acid concentrations of up to about 60% can bring about deaggregation of the premilled quinacridone powder without significant conversion of the pigment to undesired α-quinacridone.

It is desirable to use one or more surfactants during the inventive acid swelling to obtain a more readily stirrable slurry medium. The surfactants may also function as growth inhibitors. Cationic surfactants and particularly quaternary ammonium compounds are especially useful for this purpose. Representative examples of these include tetraalkylammonium compounds such as disoyadimethylammonium chloride, ditallow-imidazolium quaternary salt, cetyltrmethylammonium bromide, quatemized polyoxyethylene cocoamine, tallowtrimethylammonium chloride, tetradecyltrimethylammonium chloride, dodecyltrimethylammonium chloride, hexadecyltrirnethylammonium chloride, octadecyltrimethylammonium chloride, benzyltrimethylammonium chloride and benzyltributylammonium chloride. Such compounds are known in the art and are commercially available from a number of sources. See *McCutcheon's Emulsifiers & Detergents*, 1994 North American Edition, MC Publishing Co., Glen Rock, N.J. Nonionic surfactants also have some utility but are less preferred The amount of surfactant is generally 1 to 25% by weight based on the amount of pigment being used, with the preferred amount being 1 to 15% and the most preferred amount being 1 to 10% by weight.

Pigment particles produced by the inventive process may conveniently incorporate growth inhibitors known in the art. Such growth inhibitors may include quinacridone sulfonic acids, pyrazolyl-methylquinacridone, dimethylaminopropylquinacridonemonosulfonamide, dimethylaminopropylquinacridonedisulfonamide, and 2-phthalimidomethylquinacridone. These growth inhibitors may be added during the premilling step and/or during the acid swelling step. Amounts as small as 1 to 4% by weight based on the pigment are effective in producing smaller particle size pigments. Quinacridone sulfonic acid is especially preferred since it confers advantages in particle size growth inhibition, provides good application properties and, in addition, gives a lower viscosity slurry during the acid swelling step. The pigments may also be extended with agents that improve their dispersibility, such as abietic acid and its salts.

By the completion of the swelling step a very thick slurry is obtained. In order to handle this and to retard further undesirable crystal growth, the mixture is diluted with water, preferably to an acid strength of about 20% by weight and ripened for a period of time, advantageously at an elevated temperature. This dilution also facilitates further processing. The mixture is stirred until a smooth uniform slurry is obtained. It is preferred to carry out this period of agitation at temperatures of from 70 to 95 C, although any temperature from 25 to 100 C can be employed. The time for the ripening step is not critical and may typically be from 30 minutes to one hour or even longer. On completion of the ripening step, the pigment can be isolated by known procedures. During the ripening step any iron particles which are sheared off in the premilling step and become part of the premilled powder are completely dissolved. Thus they are eliminated as water soluble salts in the filtrate when the product is isolated.

The following examples illustrate the inventive process. However the invention is not limited thereto.

Example 1

A premilled powder is prepared by mixing 10.9 kg of crude β-quinacridone with 2.7 kg of anhydrous sodium sulfate and 544.3 g. of 2-phthalimidomethylquinacridone for 24 hours in a ball mill.

A 1 liter flask equipped with a Dean Stark trap, a condenser, a mechanical stirrer and a thermometer is charged with water (99 cc.) and concentrated sulfuric acid (117 g.). The resulting solution is cooled to 68–72° C. and Duoquad™ T-50 (2.4 g., 50%, Akzo Chemicals Inc.) is added, followed by quinacridonemonosulfonic acid (11.0 g. of a solution made by holding quinacridone (48 g.) in concentrated sulfuric acid (720 g.) for 3 hours. at 85° C.). Then n-pentanol (4.0 g.) is added followed by the above premilled powder (100 g.) The thick swelling mass is stirred for 3 hours at 68–72° C. At the end of the hold period water (272 cc) is added. Then the reaction mass is heated to 88–89° C. and stirred for 1.5 hours. The pentanol is removed by steam distillation and the reaction mass cooled to 35° C. The resulting slurry is filtered and thoroughly washed with hot water. The X-ray pattern of the isolated pigment is typical of a small particle size β-quinacridone. The average particle size for this pigment is estimated by the line broadening of the 6.5 2θ peak FWHM (Full Width at Half the Maximum height). Absolute particle size is measured by electron microscopy. By rubout in a lithographic varnish, the pigment shows a transparent masstone and a violet color in an ink diluted with $TiO_2$.

X-ray analysis indicates that the percentage of undesired α-quinacridone in the product decreases as the level of n-pentanol increases. Use of 5% n-pentanol gives a completely deaggregated product as indicated by a rubout tinting strength essentially equal to that of HT-drowned product. Changing the timing of the pentanol addition from the beginning of the acid swelling to the ripening step results in a greatly increased α-quinacridone content. Increasing the amount of n-pentanol from 5% to 15% has two effects: it substantially suppresses the formation of α-quinacridone and also increases the dispersibility as measured by rubout.

On comparison with a commercial violet pigment manufactured by HT-drowning (Ciba-Geigy's RT-201-D, Colour Index, Pigment Violet 19), the new product is comparable in transparency and dispersibility.

Example 2

A mixture of 8.16 kg of crude β-quinacridone is mixed in a ball mill with 5.44 kg of anhydrous sodium sulfate and 244.8 g. of 2-phthalimidomethylquinacridone for 24 hours. The procedure of Example 1 is followed. Under these conditions a smaller particle size pigment with increased transparency compared to that of Example 1 is obtained.

Example 3

A mixture of 2.18 kg of crude γ-quinacridone, 7.4 kg of quinacridonequinone and 1.31 kg of dihydroquinacridone is mixed in a ball mill with 2.72 kg of anhydrous sodium sulfate for 30 hours to prepare a premilled powder.

A 1 liter flask equipped with a Dean Stark trap, a condenser, a mechanical stirrer and a thermometer is charged with water (119 cc) and concentrated sulfuric acid (81 g.). The resulting solution is cooled to 68–72° C. and Duoquad T-50 (2.4 g. 50%, Akzo Chemicals Inc.) is added. Then n-pentanol (4.0 g.) is added followed by the above premilled powder (100 g.). The thick swelling mass is stirred for 3 hours at 68–72° C. At the end of this period water (272 cc) is added, the reaction mass heated to 88–89° C. and held for 1.5 hours. The pentanol is removed by steam distillation and the reaction mass cooled to 85° C. The resulting slurry is then cooled to 35° C., filtered and thoroughly washed with hot water. The resulting pigment has a gold color. By comparison of its X-ray diffraction pattern with that of the individual components, it is clear that a homogeneous solid solution is formed. By rubout in a lithographic varnish, the pigment shows a transparent masstone. It exhibits a gold color with excellent light and weather fastness when dispersed in a commercial paint system and sprayed in a metallic finish.

Example 4

A mixture of 5.9 kg of crude γ-quinacridone, 4.2 kg of quinacridonequinone and 0.77 kg of dihydroquinacridone is mixed in a ball mill with 2.72 kg of anhydrous sodium sulfate for 22 hours. The procedure of Example 3 is followed and affords a maroon pigment having a small particle size. On comparison of the X-ray diffraction pattern with that of the individual components it is clear that a solid solution is largely formed. The degree of solid solution formation in this sample is intermediate between that of the excellent solid solution formed by HT-drowning and that formed by dispersion milling, both of which give commercially acceptable products. By rubout in a lithographic varnish, the pigment shows a transparent masstone and a maroon color when finished in a metallic paint.

Example 5

A mixture of 2.72 kg of crude γ-quinacridone and 8.16 kg of 2,9-dichloroquinacridone is mixed in a ball mill with 2.72 kg of anhydrous sodium sulfate for 26 hours to prepare a premilled powder. A 1 liter flask equipped with a Dean Stark trap, a condenser, a mechanical stirrer and a thermometer meter is charged with water (86 cc) and concentrated sulfuric acid (124 g.). The resulting solution is cooled to 68–72° C. and Duoquad T-50 (2.4 g. 50%, Akzo Chemicals Inc.) is added. Then n-pentanol (4.0 g.) is added followed by the above premilled powder (100 g.). The thick swelling mass is stirred for 3 hours at 68–72° C. At the end of this period water (272 cc) is added and the reaction mass heated to 88–89° C. and stirred for 1.5 hours. The pentanol is removed by steam distillation and the reaction mass cooled to 35° C. The resulting pigment slurry is separated by filtration and washed with hot water. The product is a small particle size magenta solid solution. Rubout in a lithographic varnish shows the pigment is a close approximation of solid solution magentas made by dispersion milling, and has good transparency and color strength.

Example 6

Solvent-based Paint Formulation

1. Pigment Dispersion:

A pint jar is charged with 26.4 g. of the pigment composition of Example 1, 66.0 g. of a commercial acrylourethane resin, 14.4 g of a dispersion resin and 58.2 g. of xylene (thinner). The mixture is milled using 980 g. of grinding media for 64 hours to prepare a pigment base containing 16% pigment and 48% solids at a pigment to binder ratio of 0.5.

2. Aluminum Base:

An aluminum base is obtained by mixing 405 g. of aluminum paste (SPARKLE SILVER 5242-AR from SILBERLINE) with 315 g. of an acrylic dispersion resin and 180 g. of an acrylic resin in a quart can with an air mixer at slow to medium speed until lump-free (1–2 hours).

3. Metallic Clear Solution:

A nonaqueous dispersion resin (1353 g.), a melamine resin (786.2 g.), xylene (144.6 g.), a UV screening solution (65.6 g.) and an acrylourethane resin (471.6 g.) are added in the order given and mixed thoroughly with an air mixer for 15 minutes. A premixed solution (89.0 g.) of an acid catalyst (to promote curing) and 90.0 g. of methanol are added with continued mixing.

4. Metallic Paint Formulation:

A basecoat paint consisting of 7.1% pigment and 54.4% solids with a pigment to binder ratio of 0.15 is prepared by mixing 35.5 g. of the pigment dispersion of Example 1, 5.1 g. of aluminum base, 5.3 g. of a nonaqueous dispersion resin and 54.1 g. of a metallic clear solution.

Aluminum panels treated with gray acrylic primer are sprayed with two coats of the basecoat paint to a film thickness of 15–20 microns on a dry film basis. The two coats are separated by an interval of 90 seconds (commonly referred to as a 90 second flash) to allow the thinner to evaporate at room temperature. After a further flash of 3 minutes, an acrylic clear topcoat is applied by spraying two coats (90 second flash between coats) to a film thickness of 37–50 microns on a dry film basis. The panels are dried for 10 minutes at room temperature and baked at 120° C. for 30 minutes.

The resulting coating is an attractive, intense color with excellent two-tone in metallic paint systems. Two-tone is the degree of color change when the viewing angle is changed from horizontal to 5 or less from the vertical and is very desirable from a styling viewpoint. The pigment shows good viscosity and is comparable in every respect to Monastral® Violet R RT-201-D (Colour Index, Pigment Violet 19) from Ciba-Geigy Corp.

What is claimed is:

1. A process for preparing transparent, pigmentary quinacridone compounds and solid solutions thereof, which process comprises combining a premilled, sub-pigmentary powder containing at least one unsubstituted or substituted quinacridone or a derivative thereof with a sufficient amount of moderately concentrated sulfuric acid to form a slurry, then agitating this slurry in the presence of an organic liquid which is immiscible or only partially miscible with the slurry and which is effective in deagreggating and improving crystallinity of the pigment, for an effective length of time to convert the sub-pigmentary unsubstituted or substituted quinacridone or solid solution thereof to a transparent, pigmentary form.

2. A process according to claim 1, wherein the organic liquid is an alcohol with 4 to 12 carbon atoms or a ketone with 5 to 8 carbon atoms.

3. A process according to claim 2, wherein the organic liquid is n-butanol, n-pentanol, n-hexanol, cyclohexanol, octyl alcohol, cyclohexanone, 2-pentanone or methyl isobutyl ketone.

4. A process according to claim 3, wherein the organic liquid is n-pentanol.

5. A process according to claim 1, wherein the amount of organic liquid is from 1 to 30% by weight, based on the weight of the pigment.

6. A process according to claim 5, wherein the amount of organic liquid is from 3 to 20%.

7. A process according to claim 1, wherein the unsubstituted or substituted quinacridone is an unsubstituted or substituted quinacridone of the formula I, a dihydroquinacridone of the formula II, a quinacridonequinone of the formula III

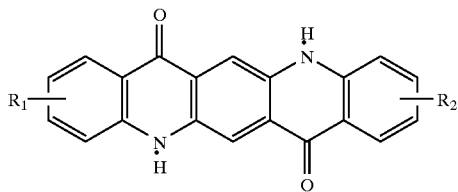

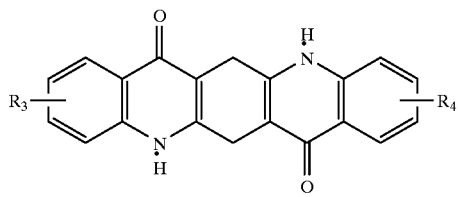

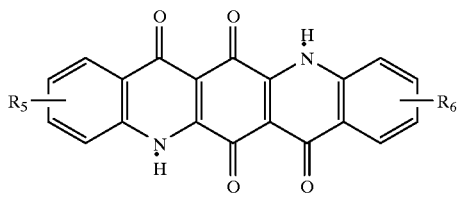

or a mixture thereof, where $R_1$, $R_2$, $R_3$, $R_4$, $R_5$ and $R_6$ are, independently, hydrogen, fluorine, chlorine, bromine, alkyl or alkoxy.

8. A process according to claim 1, wherein the weight ratio of sulfuric acid to the sub-pigmentary powder is in the range of 4–1 to 1—1, based on concentrated sulfuric acid.

9. A process according to claim 8, wherein the weight ratio of the acid to the pigment is 2.0–1 to 1—1.

10. A process according to claim 1, wherein the strength of the moderately concentrated sulfuric acid is 35 to 65% by weight.

11. A process according to claim 1, wherein the premilled sub-pigmentary powder comprises quinacridone or a substituted quinacridone and the concentration of the sulfuric acid is 50 to 60% by weight.

12. A process according to claim 1, wherein the premilled sub-pigmentary powder comprises about 25% of quinacridone and 75% of 2,9-dichloroquinacridone by weight and the concentration of the sulfuric acid is 57 to 60% by weight.

13. A process according to claim 1, wherein the premilled sub-pigmentary powder comprises γ-quinacridone, quinacridonequinone and dihydroquinacridone and the concentration of the sulfuric acid is 38 to 42% by weight.

14. A process according to claim 1, wherein the temperature of the slurry during agitation is in the range of 40 to 90° C.

15. A process according to claim 14, wherein the temperature is 50 to 80 C.

16. A process according to claim 15, wherein the temperature is 65 to 75 C.

17. A process according to claim 1, wherein the slurry further contains a surfactant.

18. A process according to claim 17, wherein the surfactant is a quaternary ammonium compound selected from the group consisting of disoyadimethylammonium chloride, ditallow-imidazolium quaternary salt, cetyltrimethylammonium bromide, quatemized polyoxyethylene cocoamine, tallowtimethylammonium chloride, tetradecyltrimethylammonium chloride, dodecyltrimethylammonium chloride, hexadecyltrimethylammonium chloride, octadecyltrimethylammonium chloride, benzyltrimethylammonium chloride and benzyltributylammonium chloride.

19. A process according to claim 1, wherein the slurry further contains a growth inhibitor.

20. A process according to claim 19, wherein the growth inhibitor is selected from the group consisting of quinacridone sulfonic acids, pyrazolyl-methylquinacridone, dimethylaminopropylquinacridonemonosulfonamide, dimethylaminopropylquinacridonedisulfonamide, and 2-phthalimidomethylquinacridone.

\* \* \* \* \*